Feb. 26, 1952 A. C. SMITH 2,587,238
LOADER FOR CAMERA FILM HOLDERS
Filed Dec. 8, 1950
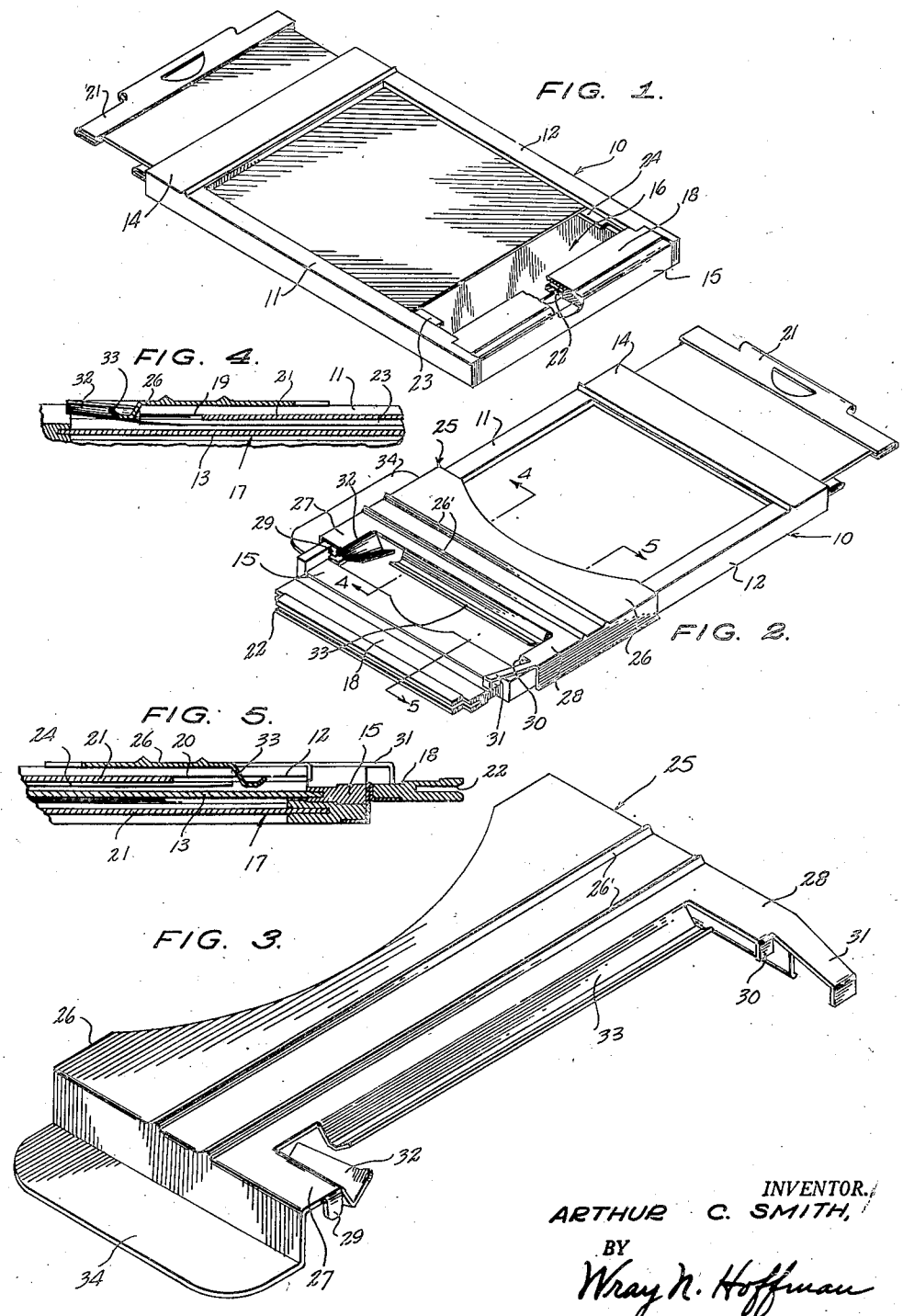
INVENTOR.
ARTHUR C. SMITH,
BY
Wray N. Hoffman
ATTORNEY.

Patented Feb. 26, 1952

2,587,238

UNITED STATES PATENT OFFICE 2,587,238

LOADER FOR CAMERA FILM HOLDERS

Arthur C. Smith, Arlington, Va., assignor of one-half to La Viella T. Harris, Bethesda, Md.

Application December 8, 1950, Serial No. 199,874

5 Claims. (Cl. 95—1)

This invention relates to a loader for camera film holders.

Camera film holders include at least two compartments each open at the top and closed at the bottom, each compartment having a cover plate insertable and withdrawable through an opening extending through one end thereof which is fixed and slidable in a grooved slide way formed in the sides thereof for closing the top of the compartment. Projecting longitudinally of the sides of each compartment between and spaced from the grooved slideway and the bottom of the compartment are opposed fixed strips which together with the adjacent portions of the sides of the compartment form a guideway for a film. The other end of each compartment is mounted for swinging movement from a position of interengagement with the sides to a position out of such interengagement. The ends of the strips contiguous to the swingable or movable end of each compartment are each spaced from the latter end to form a readily accessible entrance to the guideway for the insertion of the film therethrough when the movable end has been swung to its position out of interengagement with the sides of the compartment. As camera holders are always loaded with film in a dark room it ofttimes happens that one of the side edges is above and rides upon the upper surface of the adjacent guideway strip with the result that when the cover plate is inserted through the fixed end of the compartment and caused to travel its course through the slideway to cover the open top of the latter that the film is either damaged to an extent such as to be unusable or that the cover plate must be withdrawn and thence the film withdrawn and reinserted in the entrance to the guideway. In fact, considerable difficulty is encountered in the insertion of film into the compartments of the camera film holder.

An object of the present invention is to provide a loader for camera film holders which will serve with certainty and precision to direct and guide the insertion of a film into the guideway when the movable end of the compartment has been swung to its position of out interengagement with the sides of the compartment.

Another object of the present invention is to provide a loader for camera film holders which may be slidably supported upon and anchored to the sides of the compartment with ease and facility.

A further object of the present invention is to provide a loader for camera film holders which is simple of structure, extremely practical, and highly efficient in action.

Other objects and features of novelty will be apparent from the description taken in conjunction with the drawings in which Figure 1 is a perspective view, with parts broken away and in section, of a conventional camera film holder.

Figure 2 is a perspective view of the camera film holder of Figure 1 with the loader of the present invention in anchored position thereon.

Figure 3 is an enlarged perspective view of the loader of the present invention.

Figure 4 is a sectional elevational view taken on the line 4—4 of Figure 2.

Figure 5 is a sectional elevational view taken on the line 5—5 of Figure 2.

Referring to the drawings, the numeral 10 designates a conventional camera film holder, such holder including a pair of bars 11 and 12 arranged in parallel spaced relation, a partition plate 13 fixedly positioned between, and spaced from a face of said bars, a first end member 14 positioned adjacent one of the ends of the bars and plate and fixedly secured to the bars and plate, and a second end member 15 positioned between and adjacent the other of the ends of said bars and plate and secured to said bars and plate, to thereby form a film holder including two compartments 16 and 17 each open at the top and closed at the bottom. Since the structure of the compartments 16 and 17 is identical, and only one of such compartments is necessary for showing the application and use of the loader of the present invention, the following description will be restricted to only one of the compartments. Arranged in interengaging relation with the other ends of the bars 11 and 12 is a pivoted closure member 18 which is connected along one of its sides to the end member 15 for swinging movement from its position of interengagement with the other ends of the bars 11 and 12, Figure 1, to a position out of interengagement with the other ends of the bars 11 and 12, Figure 2. The bars 11 and 12 have formed in the facing side edges between the open top of the compartment 16 and the partition plate 13 opposed longitudinal grooves 19 and 20 which together form a grooved slideway. A cover plate 21 is insertable and withdrawal transversely through the end member 14 and is slidable in the grooved slideway. The facing side edge of the closure member 18 is also provided with a longitudinal groove 22 which receives the adjacent end of the cover plate 21 when the latter has been fully inserted in the grooved slideway and the closure member 18 has been swung to its interengagement position with the other ends of the bars 11 and 12. Projecting longitudinally of the facing side edges of the bars 11 and 12 between and spaced from the grooves 19 and 20 and the partition plate 13 are opposed fixed strips 23 and 24 which together with the adjacent portions of the side edges of the bars 11 and 12 form a guideway for a film. The ends of the strips 23 and 24 contiguous to the movable closure member 18 are each spaced from the latter member to form a readily accessible entrance to the guideway for the insertion of a film therethrough when the movable closure member 18 has been swung to its out of interengagement position with the other ends of the bars 11 and 12.

The loader of the present invention designated by the numeral 25 may be fabricated of metal, plastic material or any similar rigid material, is supportable upon the open top of the compartment 10 adjacent the entrance to the guideway, and is placeable upon and withdrawable from the open top of the compartment 10 at the will of the user. The loader comprises a carriage or channel 26 which is provided with reinforcing ribs 26', and is slidably supported upon the bars 11 and 12. Arranged longitudinally of the carriage 26 adjacent one end thereof are a pair of spaced rigid projections 27 and 28, the projections having one end fixedly secured to said one end of the carriage 26 and supported on the portions of the bars 11 and 12 adjacent the other ends thereof, Figure 2. On the other end of each of the projections 27 and 28 and engageable with the other ends of the bars 11 and 12 when the movable closure member 18 has been swung to its out of interengagement position with the other ends of the bars 11 and 12 are depending means or lugs 29 and 30. The projections 27 and 28 and the depending lugs 29 and 30 carried thereby constitute an anchoring means for the carriage 26. An element or finger 31 projects from the other end of the projection 28 and engages with the movable closure member 18 when the latter has been swung to its out of interengagement position with the other ends of the bars 11 and 12, Figure 2, for holding the movable closure member 18 in its latter named position.

An insertion directing and guiding means is on said one end of the carriage 26 intermediate the anchoring means and adjacent the entrance to the guideway for directing and guiding the insertion of a film into the slideway when the movable closure member 18 has been swung to its out of interengagement position with the other ends of the bars 11 and 12, Figure 2. The insertion directing and guiding means comprises a chute 32 arranged longitudinally of the projection 27 adjacent the inner side edge of the latter and having one end dependingly secured to such side edge, and having the other end extending below said one end of the fixed strip 23, Figure 4, and a lip 33 arranged longitudinally of said one end of the carriage 26 between and spaced from the chute 32 and the projection 28 and having one end dependingly secured to said one end of the carriage 26 and having the other end extending below said one end of the fixed strip 24, Figure 5. Projecting transversely of the side of the carriage 26 adjacent the projection 27 is a body rest 34.

With the loader 25 of the present invention supported upon the bars 11 and 12 adjacent the entrance to the film guideway, Figure 2, the holder and loader is placed by the user so that the body rest 34 bears against his waist, and while being so held, a side edge of a film is inserted so that it bears against the underface of the chute 32. Substantially simultaneously the end edge of the film is directed beneath the lip 33 whereupon an inwardly directed force is applied to the film resulting in the insertion of the film into the guideway with certainty and precision. When the film has been completely inserted in the guideway, the loader is withdrawn from the bars 11 and 12, and the auxiliary closure member 18 is swung to its interengagement position with the other ends of the bars, whereupon the cover plate 21 is moved toward and into engagement with the longitudinal groove 22 in the closure member 18 and completing the loading of the film holder with a film.

Having thus described the invention what is claimed as new and desired to be secured by Letters Patent is:

1. The combination with a camera film holder including a pair of spaced bars arranged in parallel spaced relation, a partition plate fixedly positioned between and spaced from face of said bars, a first end member positioned adjacent one of the ends of said bars and plate and fixedly secured to said bars and plate, a second end member positioned between and adjacent the other of the ends of said bars and plate and fixedly secured to said bars and plate, said second end member being spaced from said one face of said bars, a pivoted closure member arranged in interengaging relation with the other ends of said bars and connected along one of its sides to said second end member for swinging movement from its position of interengagement with the other ends of said bars to a position out of interengagement with the other ends of said bars, there being opposed longitudinal grooves in the facing side edges of said bars between said one faces of said bars and said plate and together forming a grooved slideway, a cover plate insertable and withdrawable transversely of said first end member and slidable in said slideway, and opposed fixed strips on the facing side edges of said bars between and spaced from said slideway and said plate and together with the adjacent portions of the side edges of said bars forming a guideway for a film, the ends of said strips contiguous to said closure member being each spaced from the latter member to form an entrance to said guideway, of a loader supported upon said bars adjacent the entrance to said guideway and directing and guiding the insertion of a film into said slideway when said closure member has been swung to its out of interengagement position with the other ends of said bars, said loader comprising a carriage slidably supported on said bars, anchoring means on one end of said carriage supported on said bars and engageable with the other ends of said bars when said closure member has been swung to its out of interengagement position with the other ends of said bars, and an insertion directing and guiding means intermediate said anchoring means and having one end dependingly supported from said one end of said carriage and having the other end extending below the end edges of said one end of said strips for directing and guiding the insertion of a film into the slideway when said closure member has been swung to its out of interengagement position with the other ends of said bars.

2. The combination with a camera film holder including a pair of spaced bars arranged in parallel spaced relation, a partition plate fixedly positioned between and spaced from a face of said bars, a first end member positioned adjacent one of the ends of said bars and plate and fixedly secured to said bars and plate, a second end member positioned between and adjacent the other of the ends of said bars and plate and fixedly secured to said bars and plate, said second end member being spaced from said one face of said bars, a pivoted closure member arranged in interengaging relation with the other ends of said bars and connected along one of its sides to said second end member for swinging movement from its position of interengagement with the other ends of said bars to a position out of interengagement with the other ends of said bars, there being opposed longitudinal grooves in the facing side edges of said bars between said one faces of said bars and said plate and together forming a grooved slideway, a cover plate insertable and withdrawable transversely of said first end member and slidable in said slideway, and opposed fixed strips on the facing side edges of said bars between and spaced from said slideway and said plate and together with the adjacent portions of the side edges of said bars forming a guideway for a film, the ends of said strips contiguous to said closure member being each spaced from the latter member to form an entrance to said guideway, of a loader supported upon said bars adjacent the entrance to said guideway and directing and guiding the insertion of a film into said slideway when said closure member has been swung to its out-of-interengagement position with the other ends of said bars, said loader comprising a carriage slidably supported on said bars, anchoring means on one end of said carriage supported on said bars and engageable with the other ends of said bars when said closure member has been swung to its out of interengagement position with the other ends of said bars, an insertion directing and guiding means intermediate said anchoring means and having one end dependingly supported from said one end of said carriage and having the other end extending below the end edges of said one end of said strips for directing and guiding the insertion of a film into the slideway when said closure member has been swung to its out of interengagement position with the other ends of said bars, and a finger projecting from said anchoring means and engageable with said closure member when the latter has been swung to its out-of-interengagement position with the other ends of said bars to hold said closure member in its latter named position.

3. The combination with a camera film holder including a pair of spaced bars arranged in parallel spaced relation, a partition plate fixedly positioned between and spaced from a face of said bars, a first end member positioned adjacent one of the ends of said bars and plate and fixedly secured to said bars and plate, a second end member positioned between and adjacent the other of the ends of said bars and plate and fixedly secured to said bars and plate, said second end member being spaced from said one face of said bars, a pivoted closure member arranged in interengaging relation with the other ends of said bars and connected along one of its sides to said second end member for swinging movement from its position of interengagement with the other ends of said bars to a position out of interengagement with the other ends of said bars, there being opposed longitudinal grooves in the facing side edges of said bars between said one faces of said bars and said plate and together forming a grooved slideway, a cover plate insertable and withdrawable transversely of said first end member and slidable in said slideway, and opposed fixed strips on the facing side edges of said bars between and spaced from said slideway and said plate and together with the adjacent portions of the side edges of said bars forming a guideway for a film, the ends of said strips contiguous to said closure member being each spaced from the latter member to form an entrance to said guideway, of a loader supported upon said bars adjacent the entrance to said guideway and directing and guiding the insertion of a film into said slideway when said closure member has been swung to its out of interengagement position with the other ends of said bars, said loader comprising a carriage slidably supported on said bars, anchoring means embodying a pair of spaced projections arranged longitudinally of said carriage adjacent one end of the latter supported on the portions of said bars adjacent the other ends thereof and each having one end fixedly secured to said one end of said carriage and a lug on the other end of each of said projections and engageable with the other end of the adjacent bar when said closure member has been swung to its out-of-interengagement position with the other ends of said bars, and and insertion directing and guiding means intermediate said anchoring means and having one end dependingly supported from said one end of said carriage and having the other end extending below the end edges of said one end of said strips for directing and guiding the insertion of a film into the slideway when said closure member has been swung to its out of interengagement position with the other ends of said bars.

4. The combination with a camera film holder including a pair of spaced bars arranged in parallel spaced relation, a partition plate fixedly positioned between and spaced from a face of said bars, a first end member positioned adjacent one of the ends of said bars and plate and fixedly secured to said bars and plate, a second end member positioned between and adjacent the other of the ends of said bars and plate and fixedly secured to said bars and plate, said second end member being spaced from said one face of said bars, a pivoted closure member arranged in interengaging relation with the other ends of said bars and connected along one of its sides to said second end member for swinging movement from its position of interengagement with the other ends of said bars to a position out of interengagement with the other ends of said bars, there being opposed longitudinal grooves in the facing side edges of said bars between said one faces of said bars and said plate and together forming a grooved slideway, a cover plate insertable and withdrawable transversely of said first end member and slidable in said slideway, and opposed fixed strips on the facing side edges of said bars between and spaced from said slideway and said plate and together with the adjacent portions of the side edges of said bars forming a guideway for a film, the ends of said strips contiguous to said closure member being each spaced from the latter member to form an entrance to said guideway, of a loader supported upon said bars adjacent the entrance to said guideway and directing and guiding the insertion of a film into said slideway when said closure member has been swung to its out of interengagement position with the other ends of said bars, said loader comprising a carriage slidably supported on said bars, anchoring means embodying a pair of spaced projections arranged longitudinally of said carriage adjacent one end of the latter supported on the portions of said bars adjacent the other ends thereof and each having one end fixedly secured to said one end of said carriage and a lug on the other end of each of said projections and engageable with the other end of the adjacent bar when said closure member has been swung to its out of interengagement position with the other ends of said bars, and an insertion directing and guiding means intermediate said anchoring means comprising a chute arranged longitudinally of one of said projections adjacent the inner side edge of the latter and having one end dependingly secured to said side edge and having the other end extending below said one end of the adjacent fixed strip and a lip arranged longitudinally of said one end of said carriage between and spaced from said chute and the other of said projections and having one end dependingly secured to said one end of said carriage and having the other end extending below said one end of the other of said projections for directing and guiding the insertion of a film into the slideway when the closure member has been swung to its out of interengagement position with the other ends of said bars.

5. The combination set forth in claim 4, including also a finger projecting from the other end from one of said straps and engageable with said closure member when the latter has been swung to its out of interengagement position with the other ends of said bars to hold said closure member in its latter named position.

ARTHUR C. SMITH.

No references cited.